(12) United States Patent
Steeber (10) Patent No.: US 6,241,074 B1
(45) Date of Patent: Jun. 5, 2001

(54) GUIDE DEVICE FOR TRANSFERRING ARTICLES BETWEEN CONVEYORS

(75) Inventor: Dorian F. Steeber, Anderson, SC (US)

(73) Assignee: Hartness International, Inc., Greenville, SC (US)

(*) Notice: Subject to any disclaimer, the term of this patent is extended or adjusted under 35 U.S.C. 154(b) by 0 days.

(21) Appl. No.: 09/365,133

(22) Filed: Jul. 30, 1999

(51) Int. Cl.[7] .................................................. B65G 47/26
(52) U.S. Cl. ........................ 198/456; 198/636; 198/452; 198/457.05
(58) Field of Search ............................. 198/457.01, 456, 198/457.05, 594, 836.1, 442, 452, 367, 636, 637

(56) References Cited

U.S. PATENT DOCUMENTS

| | | |
|---|---|---|
| 2,863,355 * | 12/1958 | Ledingham et al. ............. 198/599 X |
| 3,318,439 | 5/1967 | Sullivan . |
| 4,018,325 | 4/1977 | Rejsa . |
| 4,063,632 | 12/1977 | Neth et al. . |
| 4,201,286 | 5/1980 | Meier . |
| 4,413,724 | 11/1983 | Fellner . |
| 4,469,219 | 9/1984 | Cossé . |
| 4,513,858 | 4/1985 | Fellner . |
| 4,549,647 | 10/1985 | Cossé . |
| 4,718,656 | 1/1988 | Reist . |
| 4,889,223 | 12/1989 | Bergstrom . |
| 4,944,315 | 7/1990 | Focke . |
| 4,989,718 | 2/1991 | Steeber . |
| 5,067,857 | 11/1991 | Ward . |
| 5,350,050 | 9/1994 | Franke . |
| 5,413,213 | 5/1995 | Golz et al. . |
| 5,417,317 | 5/1995 | Kalinich . |
| 5,490,589 | 2/1996 | Golz et al. . |
| 5,636,723 | 6/1997 | Bulle et al. . |
| 5,690,463 | 11/1997 | Yoshie . |
| 5,772,005 | 6/1998 | Hänsch . |
| 5,778,634 * | 7/1998 | Weaver et al. .................. 198/456 X |
| 5,903,464 | 5/1999 | Stingel, Jr. et al. . |
| 6,026,947 | 2/2000 | Persson . |

FOREIGN PATENT DOCUMENTS

| | | |
|---|---|---|
| 1262886 | 3/1968 | (DE) . |
| 2307728 | 9/1974 | (DE) . |
| 2618905 | 11/1977 | (DE) . |
| 0259650 A3 | 3/1988 | (EP) . |
| 0635414 A1 | 1/1995 | (EP) . |
| 1233478 * | 5/1971 | (GB) ................................. 198/452 |
| 2213440 * | 10/1973 | (GB) ................................. 198/637 |

OTHER PUBLICATIONS

Co-pending U.S. Application Serial No. 09/036,745, filed Mar. 9, 1998, entitled "An Apparatus for Controlling the Flow of Articles".
Co-pending U.S. Application Serial No. 09/235,888, filed Jan. 22, 1999, entitled "An Apparatus for Controlling the Flow of Articles".
International Search Report for International Application No. PCT/US00/12963, filed May 12, 2000, entitled "Guide Device for Transferring Articles Between Conveyors".

* cited by examiner

*Primary Examiner*—James R. Bidwell
(74) *Attorney, Agent, or Firm*—Dority & Manning, P.A.

(57) ABSTRACT

An apparatus for regulating and controlling the flow of articles between conveyors includes a first conveyor moving in a first direction and a second conveyor onto which the articles from the first conveyor are to be transferred. The second conveyor moves generally in the same direction and parallel to the first conveyor along a portion thereof defining a transfer point. A guide device defines an inlet on the first conveyor at the transfer point. The guide device is oriented so as to extend across and move articles from the first conveyor onto the second conveyor. The guide device defines the tortuous path that changes directions at least three times, for example, by three opposite radii of curvatures, such that the articles that are in direct end to end contact on the first conveyor are separated by the guide device.

16 Claims, 5 Drawing Sheets

GUIDE DEVICE FOR TRANSFERRING ARTICLES BETWEEN CONVEYORS

BACKGROUND OF THE INVENTION

The present invention relates to a guide device for transferring articles from a first conveyor onto a second conveyor at a transfer point wherein the conveyors are moving generally in the same direction.

There are any number of situations in the art wherein articles moving on a first conveyor are transferred to a second conveyor that moves in generally the same direction. The present invention is related to any such situation. One conventional conveying system in which this takes place is an accumulator system wherein articles moving on a first conveyor are diverted from the first conveyor onto a second conveyor that forms part of an accumulator system that accumulates and stores articles before depositing the articles back onto the first conveyor. One particular type of accumulator system is disclosed in U.S. Pat. No. 4,018,325. Another type of accumulator system is disclosed in U.S. Pat. No. 4,513,858. The present invention is particularly adapted for use with an accumulator system for transferring articles that were deposited on a first conveyor at an upstream delivery station onto a second or different conveyor that forms part of the accumulator system.

A problem in the art, particularly with accumulating systems, is that the articles placed on the first conveyor at the delivery station are fed at such a speed onto the first conveyor that they have little or no longitudinal spacing therebetween, this is particularly true when the articles are square or rectangular. In this case, the articles end up backing up and abutting end-to-end on the first conveyor. However, it is often desirable that the articles have a sufficient longitudinal spacing therebetween for further processing or loading. Various devices and processes are known in the art for causing the backed up or contacting articles to space apart on the conveyor. For example, pneumatic air brakes and like devices are often utilized for this purpose. However, such pneumatic devices are relatively complicated and require extensive and complicated pneumatic systems. The present invention provides a relatively simple and inexpensive device for controlling the flow of articles and spacing of articles on the conveyor.

The present invention is not limited to applications wherein articles are transferred from one conveyor onto a second conveyor, but also has applications wherein it is desired to control the flow and spacing of articles on a single conveyor. In this regard, the present invention provides a relatively simple and inexpensive device for temporarily transferring the articles onto a second conveyor and then immediately back onto the first conveyor in a controlled manner that results in a desired longitudinal spacing between the articles.

OBJECTS AND SUMMARY OF THE INVENTION

It is therefore a principal object of the present invention to provide an improved guide device for transferring articles from a first conveyor onto a second conveyor wherein the articles achieve a desired longitudinal spacing on the second conveyor.

An additional object of the present invention is to provide an improved guide device for controlling the flow and spacing of articles on a single conveyor.

Additional objects and advantages of the invention will be set forth in part in the following description, or may be obvious from the description, or may be learned through practice of the invention.

In accordance with the objects and purposes of the invention, an apparatus is provided for regulating and controlling the flow of articles between conveyors. The apparatus includes a first conveyor moving in a first direction and a second conveyor onto which the articles from the first conveyor are to be transferred. The second conveyor moves generally in the same direction and parallel to the first conveyor along at least a portion thereof defining a transfer point for the articles. A guide device defines an inlet on the first conveyor at the transfer point for the articles. The guide device is oriented transversely so as to extend across and move articles from the first conveyor onto the second conveyor. Typically, the articles on the first conveyor have backed up to an extent that the articles are abutting each other. This is particularly true wherein the articles have a rectangular or square configuration and are lined up end-to-end on the first conveyor.

The guide device defines a tortuous path of generally three changes of direction, for example three opposite radii of curvatures, for the articles such that the articles in direct end to end contact on the first conveyor are separated by the guide device.

The guide device may preferably comprise a first contact surface having a first radius of curvature, a second contact surface opposite from the first contact surface having a second radius of curvature that is less than the first radius of curvature, and a third contact surface having a radius of curvature that is opposite to and greater than the second radius of curvature. In a preferred embodiment, the guide device comprises spaced apart guide rails. Preferably, the guide rails are adjustable so as to be adjusted according to the size of the articles to be conveyed therethrough.

The first radius of curvature is such that the articles conveyed along a first contact surface are caused to separate at corners thereof proximate to the first contact surface and to contact at corners thereof that are distant from the first contact surface. The second radius of curvature is such that the articles conveyed along the second contact surface are caused to reverse contacting corners and separate further at the corners proximate to the second contact surface. The third radius of curvature is such that the articles conveyed along the third contact surface again reverse contacting corners such that the corners proximate to the third contact surface contact with the opposite corners spaced apart a desired longitudinal spacing of the articles.

In one particularly preferred embodiment, the second conveyor takes over conveying of the articles, and the guide device deposits the articles on the second conveyor such that the articles eventually have a desired longitudinal spacing on the second conveyor upon the exiting the guide device.

In an alternative preferred embodiment, the guide device deposits the articles back onto the first conveyor from the second conveyor wherein the articles also assume a desired longitudinal spacing on the first conveyor upon exiting the guide device.

In the embodiment wherein the second conveyor takes over conveying of the articles, the conveyor may have a radius of curvature merging from the transfer point. The third radius of curvature of the third section of the guide device is initially less than the radius of curvature of the second conveyor and gradually increases to correspond to the radius of the second conveyor. In this manner, the articles conveyed along the third contact surface achieve a constant longitudinal spacing on the second conveyor, particularly at the point wherein the second conveyor merges from its radius into a straight section.

The invention will be described in greater detail below through use of the appended figures.

DETAILED DESCRIPTION

Reference will now be made in detail to the presently preferred embodiments of the invention, one or more examples of which are illustrated in the accompanying drawings. Each example is provided by way of explanation of the invention, and not meant as a limitation of the invention. For example, features illustrated or described as part of one embodiment, may be used on another embodiment to yield still a further embodiment. It is intended that the present invention include such modifications and variations as come within the scope and spirit of the invention.

Figure 1:
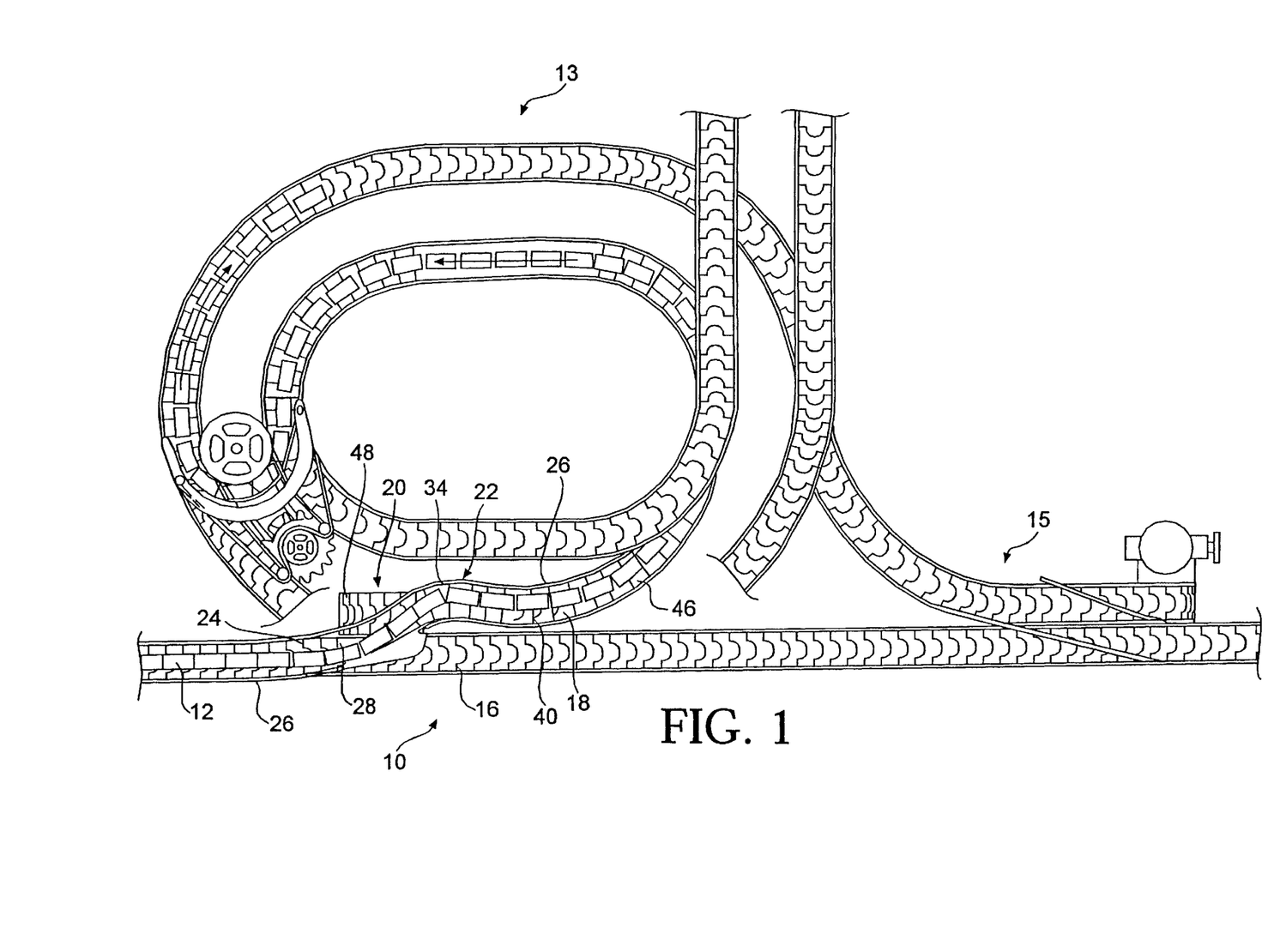
FIG. 1 is a perspective view of an accumulator conveying system incorporating the present invention.
Figure 2:
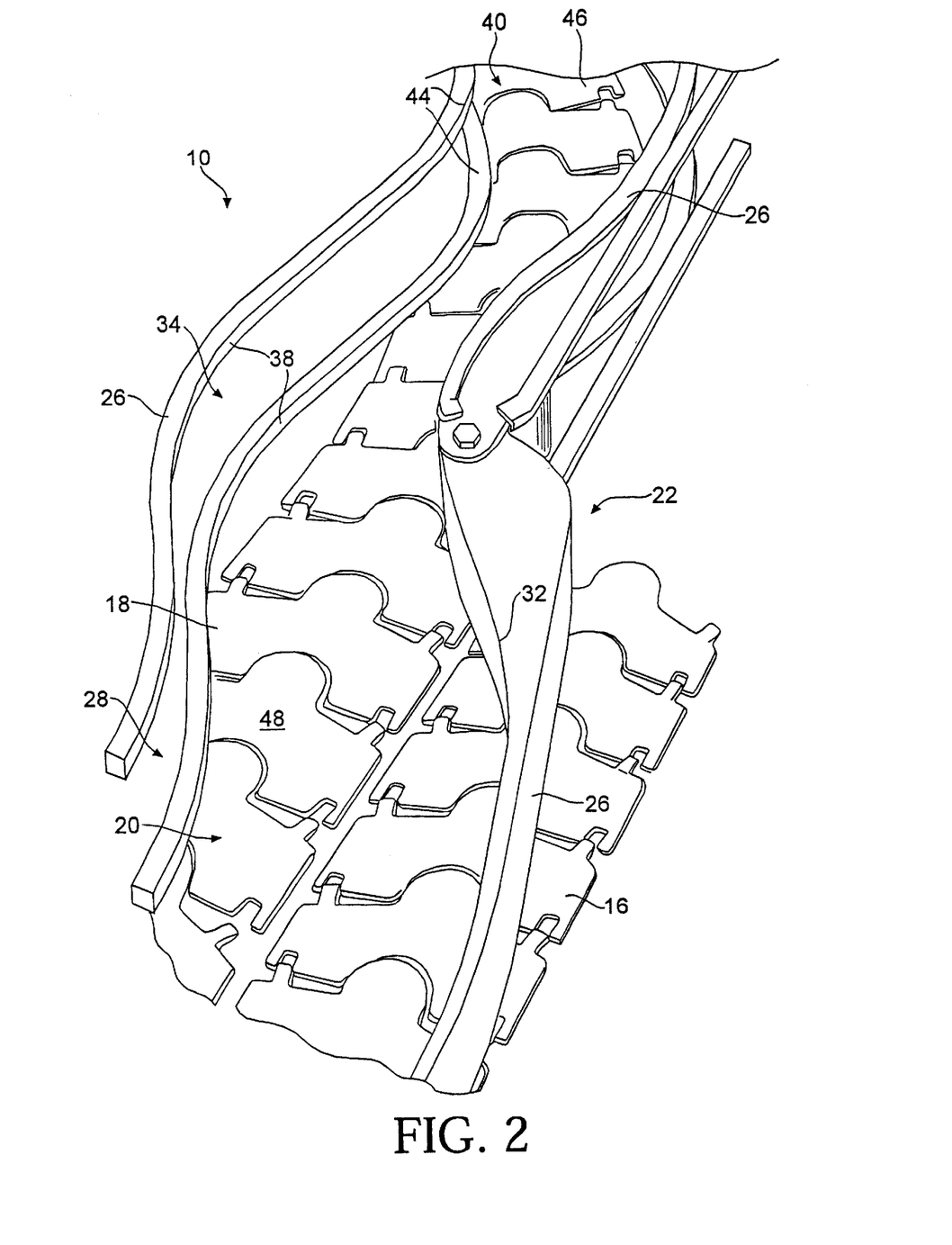
FIG. 2 is an enlarged perspective view of the guide device according to the present invention.

An apparatus for regulating and controlling the flow of articles between conveyors is illustrated in the figures generally as 10. Referring particularly to FIG. 1, apparatus 10 includes as a guide device that moves articles 12 from a first conveyor 16 onto an accumulator conveying system, generally 13. It should be appreciated that this illustrated embodiment is but one example of a desirable use of the present invention. In this type of embodiment, second conveyor 18 assumes the conveying operation until the articles are again transferred back to first conveyor 16 at transfer point 15. Such accumulator systems are well known to those skilled in the art.

Figure 5:
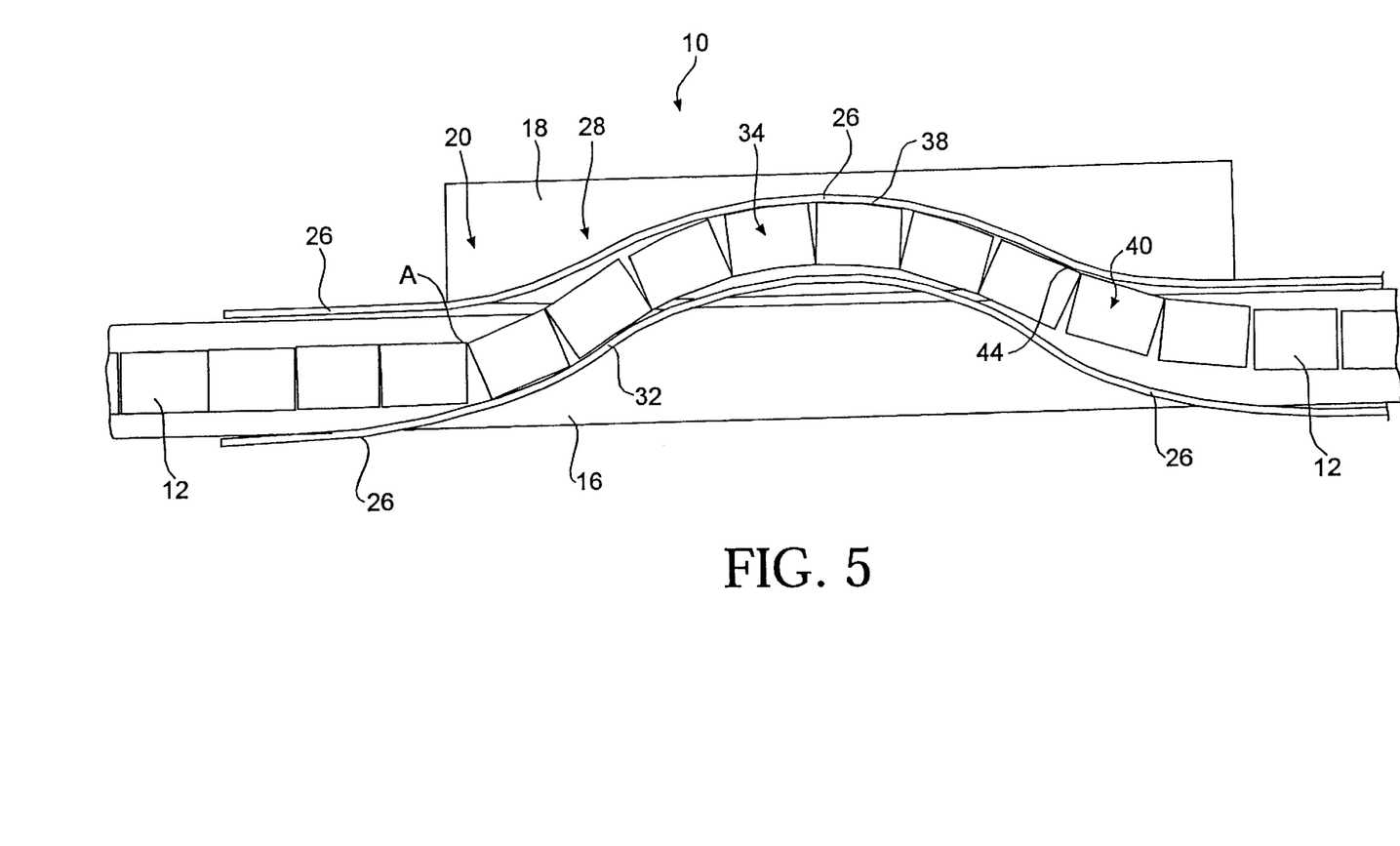
FIG. 5 is a planned view of an alternative embodiment of the present invention wherein the guide device transfers articles temporarily onto a second conveyor and then immediately back onto a first conveyor.

An alternative embodiment of apparatus 10 according to the invention is illustrated generally in FIG. 5. In this embodiment, articles 12 on first conveyor 16 are diverted from conveyor 16 onto a second conveyor 20, and then diverted immediately back onto conveyor 16 but with a desired longitudinal spacing between articles 12. This embodiment of the invention acts more or less as a control station or "speed bump" for regulating the flow of articles on conveyor 16.

Accordingly, it should be appreciated that the invention is not limited in its particular field of use within the art.

Referring to the figures in general, apparatus 10 according to the invention includes a first conveyor 16 moving in a first direction so as to convey articles 12 thereon. The invention is particularly useful wherein articles 12 have a square or rectangular shape, as particularly illustrated in FIGS. 1 and 5. A second conveyor 18 is disposed at a transfer point 20 and moves generally in the same direction and parallel to the first conveyor along at least a portion thereof at transfer point 20.

A guide device, generally 22, defines an inlet 24 at transfer point 20. Guide device 22 is oriented transversely with respect to the first conveyor 16 so as to extend across and move articles from first conveyor 16 onto second conveyor 18, as particularly illustrated in FIGS. 1 and 5. Guide device 22 defines a tortuous path of three changes of direction, for example by opposite radii of curvatures. This tortuous path causes articles 12 that have become backed up on first conveyor 16, as illustrated in FIG. 5, to space apart longitudinally as they exit guide device 22, as illustrated particularly in FIGS. 4 and 5. In this manner, guide device 22 can be thought of as a "pressure relief" for the system. The tortuous path defines by guide device 22 increases the overall effective distance the articles must travel and orients the articles so that they can assume a spaced apart condition, as described in greater detail below.

In a preferred embodiment of guide device 22, guide rails or members 26 define the guide device 22. Guide rails 26 are preferably adjustable relative to each other so as to be adjusted according to the width (slightly greater) of articles conveyed therethrough. For example, guide rails 26 may be movably mounted on associated framework of the conveyors.

Figure 3:
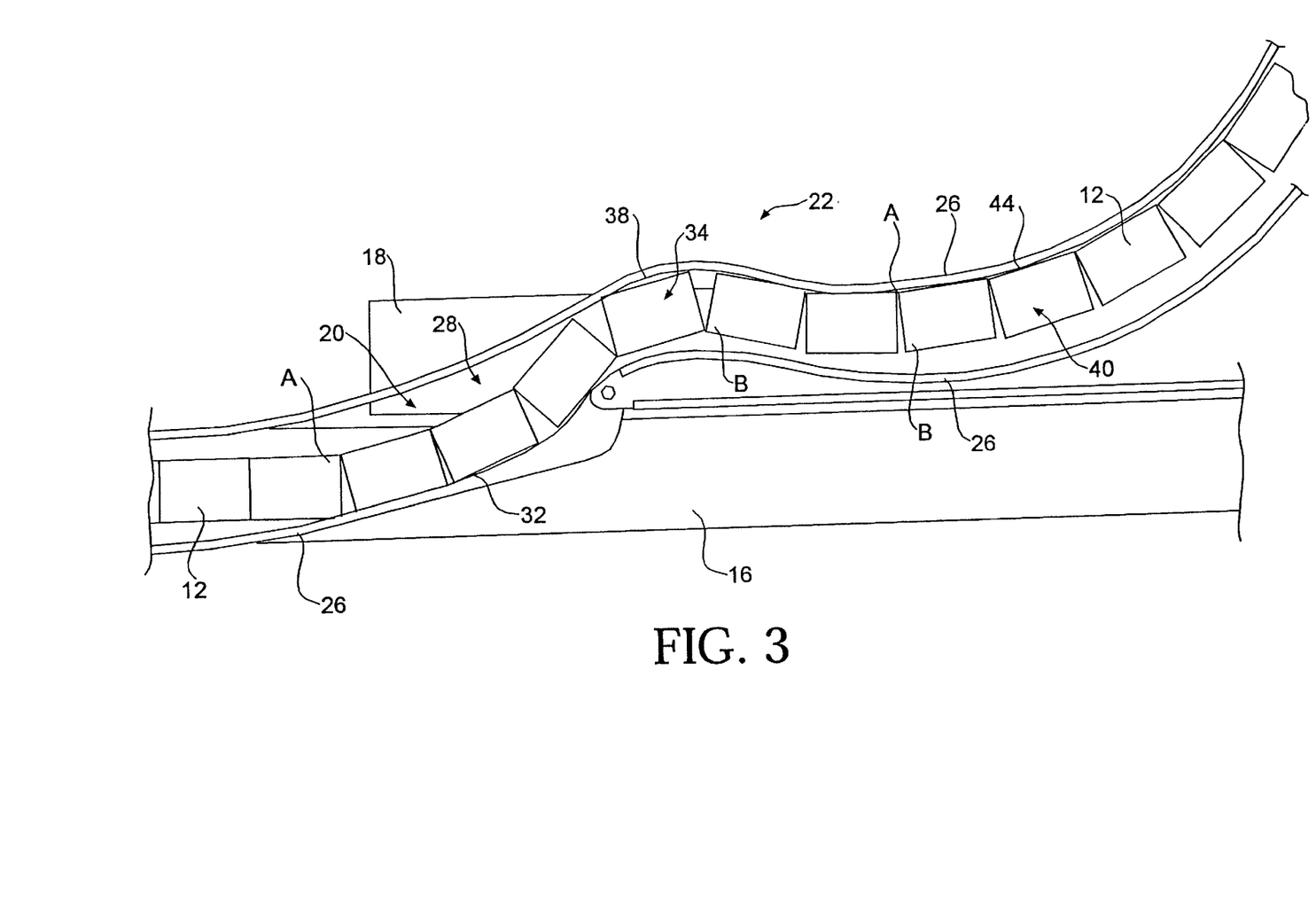
FIG. 3 is a perspective plan view particularly illustrating the conveying of articles through the guide device of FIG. 2.

Preferring particularly to FIGS. 2 through 5, guide rails or members 26 comprise a first section, generally 28, having a first radius of curvature and a first contact surface 32. Articles in a backed up condition on first conveyor 16 are initially directed into first section 28 against first contact surface 32. The first radius of curvature of first contact surface 32 is such that the articles are forced to spread apart at the corners proximate to or adjacent first contact surface 32 and to contact at the opposite corners A, as illustrated in FIGS. 3 and 5.

A second section 34 merges from first section 28 and has a second contact surface 38 with a second radius of curvature. This radius of curvature is substantially less than that of the first radius of curvature of first contact surface 32. Referring particularly to FIG. 3, it can be seen that articles 12 are forced against second contact surface 38 and its radius of curvature forces the articles to reverse orientation such that corners B opposite from contact surface 38 contact and corners A adjacent to contact surface 38 spread apart.

A third section 40 defining the tortuous path merges from second section 34. Third section 40 has a third contact surface 44 having a third radius of curvature that is opposite and greater than the second radius of curvature. The articles are conveyed along third contact surface 44 and its radius of curvature causes the articles to again reverse orientation such that corners A adjacent to third contact surface 44 contact and the opposite corners B spread apart.

Figure 4:
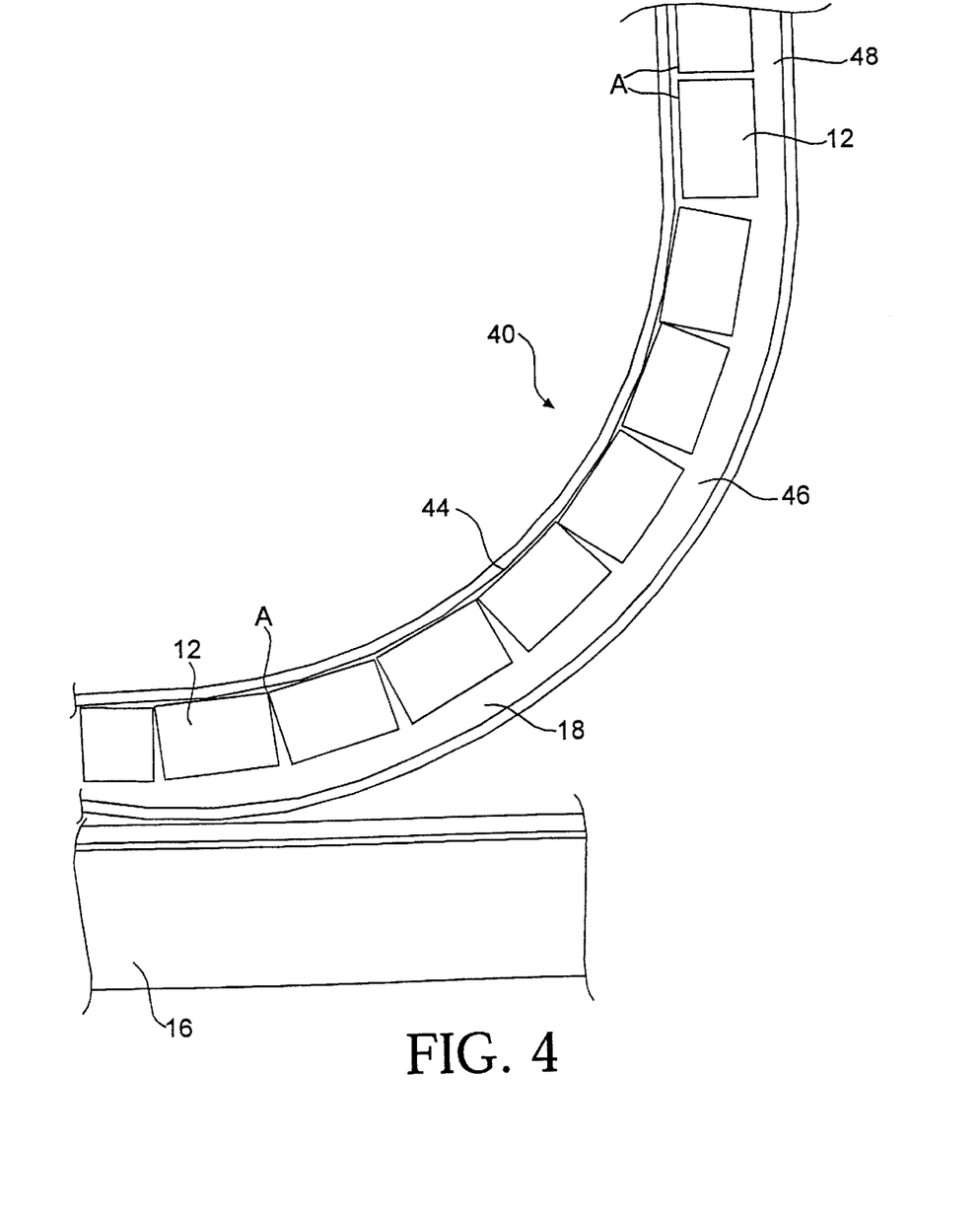
FIG. 4 is a perspective plan view particularly illustrating the radius of the second conveyor.

Because the articles have been forced to spread apart at the corners as they go through a radius of curvature, and also due to the increased effective conveying distance, the articles will assume a longitudinal spacing once they are conveyed onto a straight section of conveyor 18, as is particularly illustrated in FIG. 4. In this regard, the radius of third section 40 is initially less than the radius of a bend 46 in second conveyor 16, which causes the articles to initially stay against third contact surface 44 and spread apart at corners B, and then increases to generally correspond to the radius of curvature of bend 46. As second conveyor 18 merges from bend 46 into a straight section 48, articles 12 will assume a longitudinal spacing, as indicated in FIG. 4.

In the embodiment illustrated in FIG. 5, second conveyor 18 is not a primary conveyor for articles 12, but is disposed parallel to primary conveyor 16 for a relatively short distance. Guide device 22 in this embodiment controls the flow of articles 12 and spaces the articles apart as described above with regards to FIGS. 3 and 4, and then deposits articles 12 back onto conveyor 16 having the desired longitudinal spacing.

It should be appreciated by those skilled in the art that the tortuous path defined by guide device 22 can be achieved by any number of configurations. For example, it is not absolutely necessary that the tortuous path be defined by three continuous opposite radii of curvatures. The tortuous path may be defined by more abrupt or angled changes, as the case may be. Additionally, the structure of guide device 22 can take on any form or configuration, and need not be defined by rails 26 as illustrated in the figures.

It should also be appreciated by those skilled in the art that the guide device apparatus according to the invention can be placed anywhere along a conveying system wherein it is desired to periodically regulate or control the flow of articles on a primary conveying system 16. The embodiment of FIG. 5 is particularly useful in this regard.

It should thus be appreciated by those skilled in the art that various modifications and variations can be made in the invention without departing from the scope and spirit of the invention. It is intended that the present invention include such modifications and variations as come within the scope of the appended claims and their equivalents.

What is claimed is:

1. An apparatus for regulating and controlling the flow of articles between conveyors, said device comprising:

a first conveyor moving in a first direction, and a second conveyor onto which articles from said first conveyor are to be transferred, said second conveyor moving generally in the same direction and parallel to said first conveyor along at least a portion thereof defining a transfer point;

a pair of relatively constant height spaced apart guide members defining an inlet on said first conveyor at said transfer point, said guide members oriented transversely so as to extend across and move articles from said first conveyor onto said second conveyor; and said guide members defining a tortuous path for the articles that changes direction at least three times before the articles are longitudinally aligned and spaced on said second conveyor.

2. An apparatus for regulating and controlling the flow of articles between conveyors, said device comprising:

a first conveyor moving in a first direction, and a second conveyor onto which articles from said first conveyor are to be transferred, said second conveyor moving generally in the same direction and parallel to said first conveyor along at least a portion thereof defining a transfer point;

a pair of spaced apart guide members defining an inlet on said first conveyor at said transfer point, said guide members oriented transversely so as to extend across and move articles from said first conveyor onto said second conveyor;

said guide members defining a tortuous path for the articles that changes direction at least three times before the articles are longitudinally aligned and spaced on said second conveyor; and wherein said guide members comprise a first section having a first radius of curvature, a second section adjacent said first section in a moving direction of the articles and having a second radius of curvature less than said first radius of curvature, and a third section adjacent said second section in a moving direction of the articles having a radius of curvature greater than said second radius of curvature.

3. The apparatus as in claim 2, wherein said first section defines a first contact surface against which the articles are initially guided onto said second conveyor, said second section defining a second contact surface opposite said first contact surface against which the articles are conveyed, and said third section defining a third contact surface merging from said second contact surface.

4. The apparatus as in claim 3, wherein said first radius of curvature is such that articles conveyed along said first contact surface are caused to separate at corners thereof proximate to said first contact surface and to contact at corners thereof distant from said first contact surface, said second radius of curvature is such that articles conveyed along said second contact surface are caused to reverse contacting corners and separate further at corners proximate to said second contact surface, and said third radius of curvature is such that articles conveyed along said third contact surface reverse contacting corners again such that corners proximate to said third contact surface contact with opposite corners spaced apart a desired longitudinal spacing of the articles.

5. The apparatus as in claim 4, wherein said second conveyor has a radius of curvature merging from said transfer point, said third radius of curvature of said third section being initially less than said radius of curvature of said second conveyor and increasing to correspond to that of said second conveyor such that articles conveyed along said third contact surface achieve a constant longitudinal spacing on said second conveyor.

6. The apparatus as in claim 5, wherein said second conveyor has a straight section merging from radius of curvature thereof, the articles conveyed along said third contact surface with corners proximate to said third contact surface contacting becoming longitudinally spaced apart on said straight section.

7. The apparatus as in claim 1, wherein said guide members comprise variably positionable rails for changing the spacing therebetween to correspond to varying sized articles.

8. An apparatus for regulating and controlling the flow of articles between conveyors, said device comprising:

a first conveyor moving in a first direction, and a second conveyor onto which articles from said first conveyor are to be transferred, said second conveyor moving generally in the same direction and parallel to said first conveyor along at least a portion thereof defining a transfer point;

a guide device defining an inlet on said first conveyor at said transfer point, said guide device oriented transversely so as to extend across and move articles from said first conveyor onto said second conveyor; and said guide device defining a substantially constant height tortuous path of three opposite radii of curvatures for the articles such that articles in direct end-to-end contact on said first conveyor are separated by said guide device.

9. An apparatus for regulating and controlling the flow of articles between conveyors, said device comprising:

a first conveyor moving in a first direction, and a second conveyor onto which articles from said first conveyor are to be transferred, said second conveyor moving generally in the same direction and parallel to said first conveyor along at least a portion thereof defining a transfer point:

a guide device defining an inlet on said first conveyor at said transfer point, said guide device oriented transversely so as to extend across and move articles from said first conveyor onto said second conveyor;

said guide device defining a tortuous path of three opposite radii of curvatures for the articles such that articles in direct end-to-end contact on said first conveyor are separated by said guide device; and wherein said guide device comprises first contact surface having a first radius of curvature, a second contact surface opposite from said first contact surface and having a second radius of curvature less than said first radius of curvature, and a third contact surface having a radius of curvature greater than said second radius of curvature.

10. The apparatus as in claim 9, wherein said guide device comprises spaced apart guide rails.

11. The apparatus as in claim 9, wherein said first radius of curvature is such that articles conveyed along said first contact surface are caused to separate at corners thereof proximate to said first contact surface and to contact at corners thereof distant from said first contact surface, said second radius of curvature is such that articles conveyed along said second contact surface are caused to reverse contacting corners and separate further at corners proximate to said second contact surface, and said third radius of curvature is such that articles conveyed along said third contact surface reverse contacting corners again such that corners proximate to said third contact surface contact with opposite corners spaced apart a desired longitudinal spacing of the articles.

12. The apparatus as in claim 11, wherein said second conveyor has a radius of curvature merging from said transfer point, said third radius of curvature of said third section being initially less than said radius of curvature of said second conveyor and increasing to correspond to that of said second conveyor such that articles conveyed along said third contact surface achieve a constant longitudinal spacing on said second conveyor.

13. The apparatus as in claim 8, wherein said guide device deposits the articles on said second conveyor wherein the articles are longitudinally spaced apart on said second conveyor upon exiting said guide device.

14. An apparatus for regulating and controlling the flow of articles between conveyors, said device comprising:

a first conveyor moving in a first direction, and a second conveyor onto which articles from said first conveyor are to be transferred, said second conveyor moving generally in the same direction and parallel to said first conveyor along at least a portion thereof defining a transfer point;

a guide device defining an inlet on said first conveyor at said transfer point, said guide device oriented transversely so as to extend across and move articles from said first conveyor onto said second conveyor;

said guide device defining a tortuous path of three opposite radii of curvatures for the articles such that articles in direct end-to-end contact on said first conveyor are separated by said guide device; and wherein said guide device deposits the articles back onto said first conveyor from said second conveyor wherein the articles are longitudinally spaced apart on said first conveyor upon exiting said guide device.

15. The apparatus as in claim 14, wherein said guide device comprises first contact surface having a first radius of curvature, a second contact surface opposite from said first contact surface and having a second radius of curvature opposite from said first radius of curvature, and a third contact surface having a radius of curvature opposite from said second radius of curvature.

16. The apparatus as in claim 15, wherein said second radius of curvature is less than said first and third radii of curvatures.

* * * * *